United States Patent
Weller et al.

(10) Patent No.: US 6,983,522 B2
(45) Date of Patent: Jan. 10, 2006

(54) EXCHANGE DEVICE FOR GRIP HEADS COMPRISING A PLURALITY OF CLAMPING JAWS

(75) Inventors: Hans-Michael Weller, Marbach (DE); Wilhelm Hetschel, Brackenheim (DE)

(73) Assignee: Hainbuch GmbH Spannende Technik, (DE)

( * ) Notice: Subject to any disclaimer, the term of this patent is extended or adjusted under 35 U.S.C. 154(b) by 0 days.

(21) Appl. No.: 10/484,940

(22) PCT Filed: Jul. 22, 2002

(86) PCT No.: PCT/EP02/08162

§ 371 (c)(1),
(2), (4) Date: Jun. 11, 2004

(87) PCT Pub. No.: WO03/011504

PCT Pub. Date: Feb. 13, 2003

(65) Prior Publication Data
US 2004/0206217 A1    Oct. 21, 2004

(30) Foreign Application Priority Data
Jul. 27, 2001    (DE) ............................... 101 38 343

(51) Int. Cl.
*B25B 1/24* (2006.01)

(52) U.S. Cl. ................. 29/268; 269/3; 269/6

(58) Field of Classification Search ................ 29/268, 29/270, 278; 269/3, 6, 95
See application file for complete search history.

(56) References Cited

U.S. PATENT DOCUMENTS

| 2,277,816 | A |   | 3/1942  | Brown |        |
|-----------|---|---|---------|-------|--------|
| 5,255,579 | A | * | 10/1993 | Fortin | ......................... 81/424 |
| 6,715,193 | B1 | * | 4/2004 | Wynn, Jr. | .................... 29/239 |

FOREIGN PATENT DOCUMENTS

| DE | 17 03 579 U1 | 7/1955 |
| DE | 28 31 140 A  | 1/1980 |
| DE | 195 07 347 C1 | 9/1996 |
| FR | 25 65 151    | 12/1985 |
| GB | 3 67 221     | 2/1932 |

* cited by examiner

*Primary Examiner*—Lee D. Wilson
(74) *Attorney, Agent, or Firm*—Akerman Senterfitt

(57) ABSTRACT

An exchange device for grip heads comprising a plurality of clamping jaws, consisting of a carrier plate having a borehole. Pivoting arms are axially staggered in relation to the carrier plate and are concentrically arranged in relation to the borehole. The pivoting arms are articulated by a joint in such a way that they can be pivoted in a plane containing the axis of the borehole. The pivoting movement is thus carried out radially in relation to the axis of the borehole. Coupling elements are arranged on the pivoting arms, by which the exchange device can be coupled to the clamping jaws of the grip head and detached from the same.

19 Claims, 6 Drawing Sheets

EXCHANGE DEVICE FOR GRIP HEADS COMPRISING A PLURALITY OF CLAMPING JAWS

FIELD OF APPLICATION AND PRIOR ART

The present invention relates to a changing device for closers having several gripping jaws. In connection with lathes it is known to make use of two-part collet chucks. Such collet chucks comprise a draw-in or push-out tube part and a closer. By means of a coupling device the draw-in tube can be coupled axially to the closer and, if necessary, they can be separated from one another.

Changing devices are known for coupling and uncoupling the closer with respect to the collet chuck.

A changing device for such closers is e.g. known from DE 28 31 140 C2. A closer changing device described therein comprises a carrier plate with a bore or hole. Swivel arms are articulated by means of a joint to the carrier plate in axially displaced manner with respect thereto and concentric to the bore. The joint is aligned in such a way that the swivel arms can be swivelled in a plane radial to the bore axis. The swivel arms have coupling members for coupling the changing device to the gripping jaws of the closer. Action takes place on the swivel arms by means of an axially movable tension bolt, which traverses the carrier plate.

The changing device is used for the application thereof to the closer and by means of coupling members a connection is formed between the changing device and the gripping jaws. Actuation then takes place and as a result the connection between the closer and the draw-in tube is released or can be restored again.

The actuation of the changing device in the embodiment involved e.g. takes place by means of a handwheel. The handwheel is provided on its inside with a thread, whose corresponding element appears on the tension bolt. By turning the handwheel the tension bolt can be drawn further into the carrier plate and removed from the closer. There is a swivelling movement of the swivel arms and therefore an operation of the gripping jaws permitting a release of the closer from the draw-in tube. On turning the handwheel in the opposite direction there is an opposing actuation of the tension rod, which is moved back into its original position. Thus, a release of the changing device from the closer is again possible. The closer is either to be secured again in the draw-in tube or is in a position remote from said tube, so that it can be manually manipulated.

Besides this form of manual operation of the changing device, there are also various external force actuations, e.g. using pneumatic or hydraulic operating cylinders. Such a pneumatic or hydraulic actuation of the operating cylinder always presupposes that there is a corresponding fluidic external force source with connection possibilities on the particular machine where the changing device is to be used.

Thus, a manual operation is a simplified variant which can be universally used as compared with such an external force-controlled actuation. Manual actuation is possible independently of the circumstances of the particular machine and no separate power supply connection is required. In the case of manual actuation it is necessary to introduce high actuating forces into the closer in order to permit a release of said closer from the draw-in tube. In the hitherto known manual changing devices such forces have been introduced via a screw thread using a handwheel. This is disadvantageous if for the operation of the device it is necessary to use both hands, e.g. one hand for preparing and holding the device and the other for operating the handwheel. It is also often unfavourable to perform rotary movements in the interior of the machine area. This more particularly applies with multi-spindle machines, where numerous tools project into the machine area and where the spatial arrangement of the closers for the chucking of workpieces is restricted.

PROBLEM AND SOLUTION

The problem of the invention is to provide a changing device of the aforementioned type, which permits simplified operation and greater operating safety.

This problem is solved by a changing device having the features of claim 1. Advantageous and preferred developments of the invention form the subject matter of the further claims and are explained in detail hereinafter. By express reference the wording of the claims is made into part of the content of the description.

A changing device for closers with several gripping jaws according to the invention comprises a carrier plate with a bore. Swivel arms are arranged concentrically to the bore in axially displaced manner relative to the carrier plate. They are articulated by means of a joint in such a way that they are swivellable in a plane comprising the bore axis, the swivelling movement taking place radially to said bore axis. On the swivel arms are provided coupling members by means of which the changing device can be coupled to and then detached from the gripping jaws of the closer. In addition, the changing device has an axially movable tension bolt located in the carrier plate bore and which engages on the swivel arms. Thus, the radial swivelling position of the swivel arms is influenced by means of the tension bolt position.

Operating levers are provided for manually operating the changing device. A first operating lever is fixed with respect to the carrier plate. The second operating lever is arranged in rotary manner with respect to the first lever and engages at least indirectly on the tension bolt.

According to a preferred development the operating levers can be transferred from a starting position into an operating end position. In the starting position the operating levers are spaced far apart. They are in particular so far apart that they can just be grasped with one or both hands. The operating levers can be transferred into an operating end position, where they are adjacent to one another.

The transfer of the operating levers from the starting position into the operating end position can take place through a relative movement of the second operating lever with respect to the first operating lever. In the starting position of the manually operable operating levers, the changing device can be engaged with the closer by means of coupling members and said engagement can be removed again. Thus, in the starting position of the operating levers the changing device can be applied to or released from the closer. In the operating end position of the operating levers an engagement on the closer is possible in such a way that it can be coupled to or uncoupled from a machine-side holder and generally the closer is held on the draw-in tube.

The connection between the closer and the machine-side holder can be in the form of a groove made in the latter and behind which engage the corresponding retaining tongues on the individual gripping jaws of the closer. This engaging-behind connection is preferably cancelled out through the gripping jaws being moved relative to one another. There is an elastic deformation of the elastomeric material connecting the gripping jaws in the vicinity of the slots between the latter.

According to an advantageous development of the invention the second operating lever can be rotated about a rotation axis parallel to the bore with respect to the first operating lever. The second operating lever can in particular be rotated coaxially to the bore. According to a preferred development the second operating lever is constructed in projecting manner on a swivel, which is supported by means of at least two levers at least indirectly on the carrier plate. The levers are used for guiding the rotary movement and for producing an axial displacement path of the tension bolt relative to the carrier plate when an operation of the operating lever takes place.

There are in particular three levers. They are preferably positioned equidistantly and uniformly relative to the bore centre axis. In particular, the levers can have on each of their two ends a ball end, which is held in a corresponding cup in the carrier plate or the swivel.

According to a further development the two ends of the levers are held in such a way that on operating the operating levers out of the starting position in the direction of the operating end position they tilt up and increase the spacing between the carrier plate and the swivel. The tension bolt, which is in particular fixed to the swivel, effects a translatory movement relative to the bore in the carrier plate. A swivelling of the swivel arms is produced by this movement of the tension bolt.

According to another development the second operating lever is rotatable about a rotation axis perpendicular to the bore axis with respect to the first operating lever. Between the first and second operating levers there can in particular be a toggle lever arrangement. The toggle lever arrangement more particularly guides the operating movement of the second operating lever relative to the first operating lever, which is fixed with respect to the carrier plate. Preferably the first operating lever projects radially from a pipe section arranged on the carrier plate in the axial extension of the bore.

A toggle lever arrangement preferably has two toggle lever arms. The second operating lever is connected by means of the longer of the two lever arms to the tension bolt. According to a development of the invention a sleeve is inserted in the bore. The tension bolt projects into the pipe section and has two parallel, diametrically facing elongated holes, together with a recess in the intermediate area. The tension bolt is longitudinally displaced arranged in the pipe section with respect to the king pin. The king pin traverses the second operating lever at a certain distance from the bearing opening of the longer lever arm. This spacing forms the shorter lever arm of the toggle lever arrangement. In such an arrangement the second operating lever is on the one hand guided by the construction of the elongated holes in the sleeve and on the other by means of the longer lever arm with respect to the pipe section is secured in an area fixed relative to the carrier plate. This fixes the swivelling movement of the second operating lever relative to the first operating lever.

A sleeve insertable in the pipe section is secured in the latter in order to guide a safety bolt relative to its own longitudinal axis and the tension bolt within the pipe section. According to a preferred development said safety bolt simultaneously constitutes the pivot bearing of the longer operating lever on the tension bolt.

It is also possible for the second operating lever to be supported on the inner face of the sleeve by means of a rounded rolling edge.

With toggle lever arrangements it is advantageous if the three swivel axes of the arrangement are at least approximately in one plane in the operating end position. This plane is preferably in the median plane of the elongated holes of the toggle lever arrangement.

It is possible in all the arrangements to provide a return spring between the first and second operating levers and which acts on the second lever in such a way that it automatically moves back into the starting position. It is also possible for the swivel lever to be supported only in the pull direction, i.e. the force introduction direction, by forces from the operating levers on the tension bolt, i.e. the tension bolt is supported there both in the pull and push directions. Supporting in both directions makes it possible on retracting the operating levers into the starting position to move the swivel levers back into the starting position in which they can be coupled to corresponding closers. For fixing the starting position of the swivel levers a support on the tension bolt in the push and pull directions is unnecessary if corresponding restoring means are provided between the swivel levers and carrier plate. These restoring means can simultaneously serve as restoring means for the operating levers, because they act back indirectly on the operating means by means of the operating bolts. They are also suitable to restore the original starting position.

These and further features can be gathered from the claims, description and drawings and the individual features, both singly and in the form of subcombinations, can be implemented in an embodiment of the invention and in other fields and can represent advantageous, independently protectable constructions for which protection is claimed here.

BRIEF DESCRIPTION OF THE DRAWINGS

The invention is illustrated further hereinafter by embodiments and the attached drawings, wherein show.

DETAILED DESCRIPTION OF EMBODIMENTS

Figure 1:
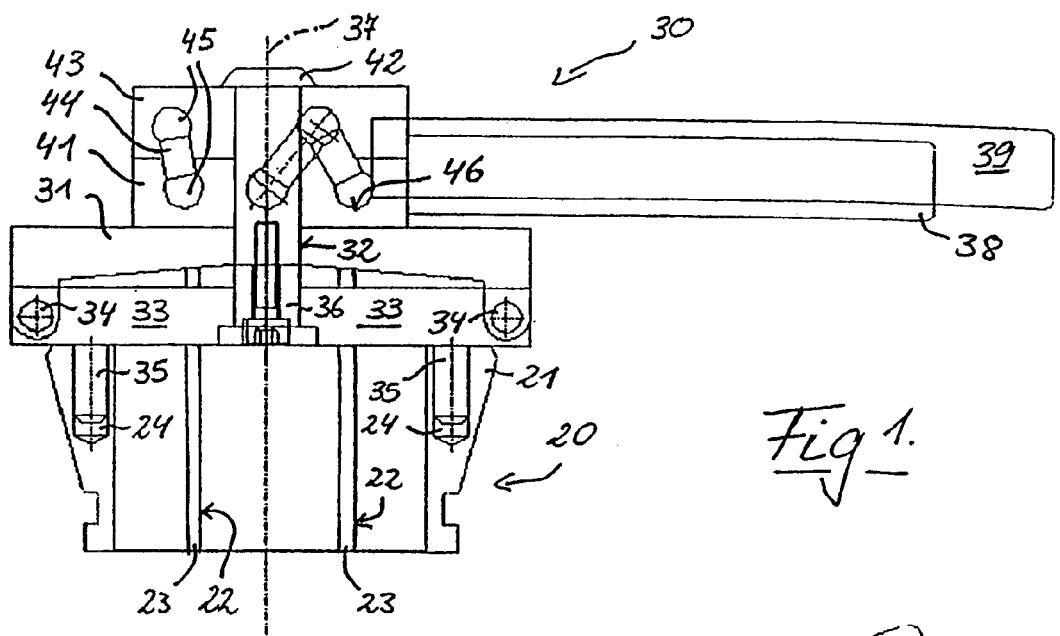
FIGS. 1 to 4 In each case side and plan views of a first embodiment of an inventive changing device, which is coupled to a closer.
Figure 1:
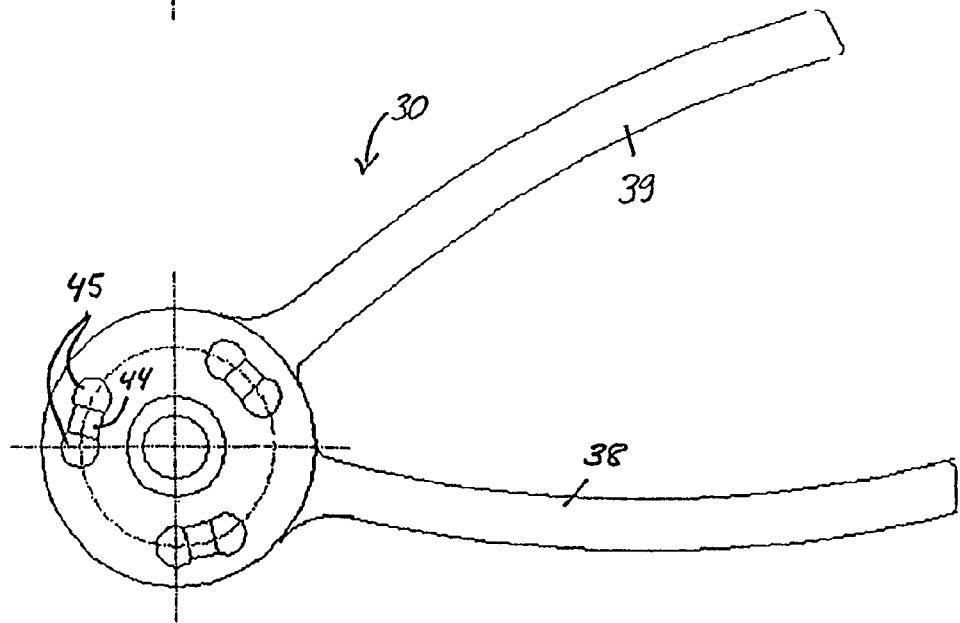
Figure 2:
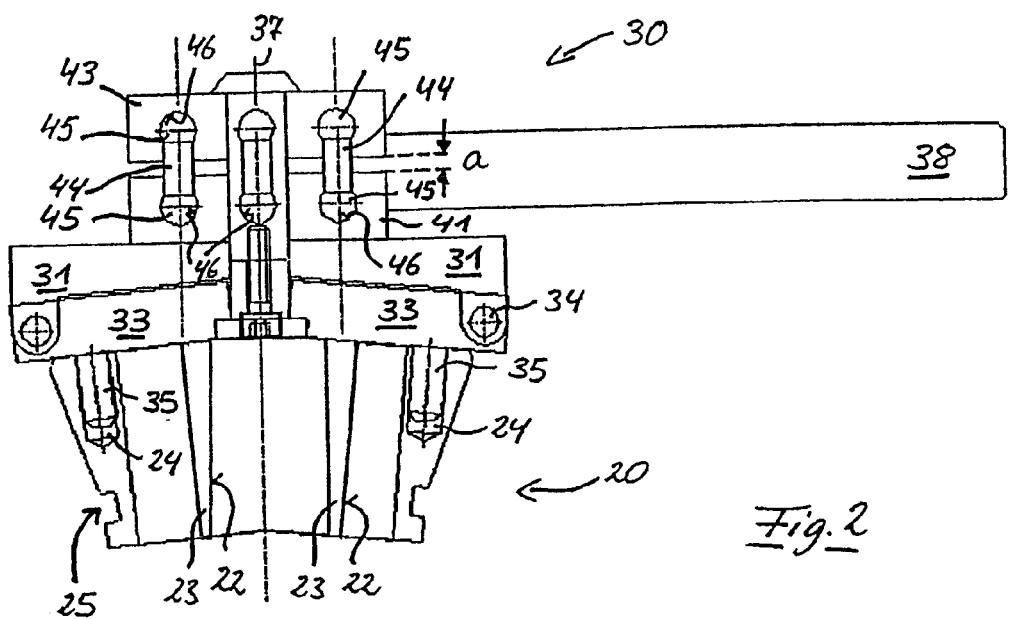
Figure 2:
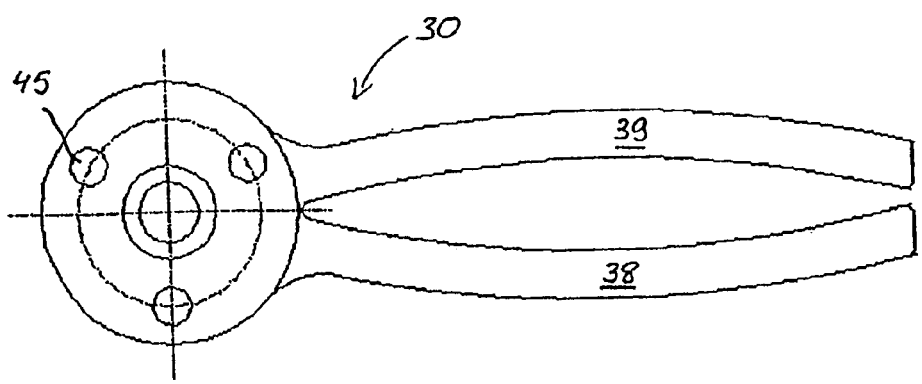
Figure 3:
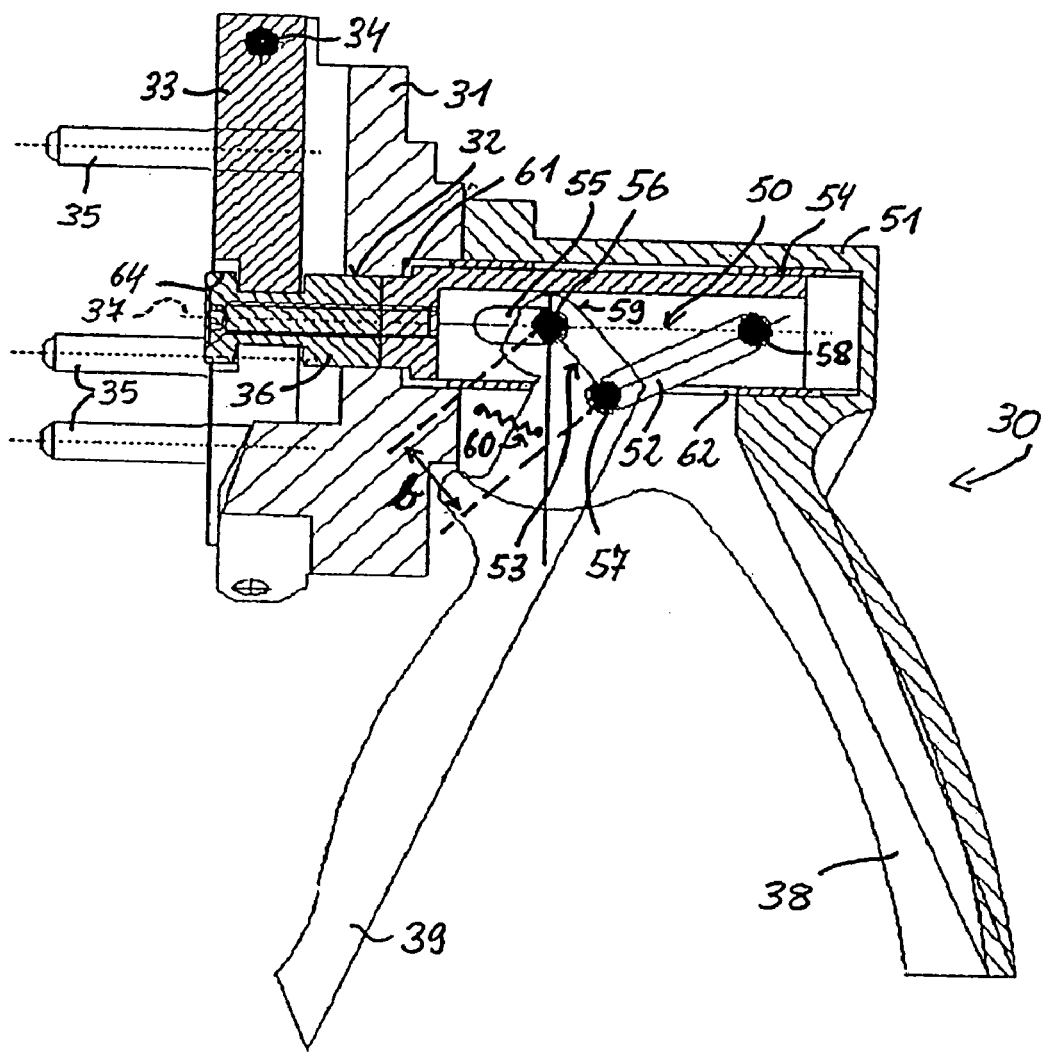
Figure 4:
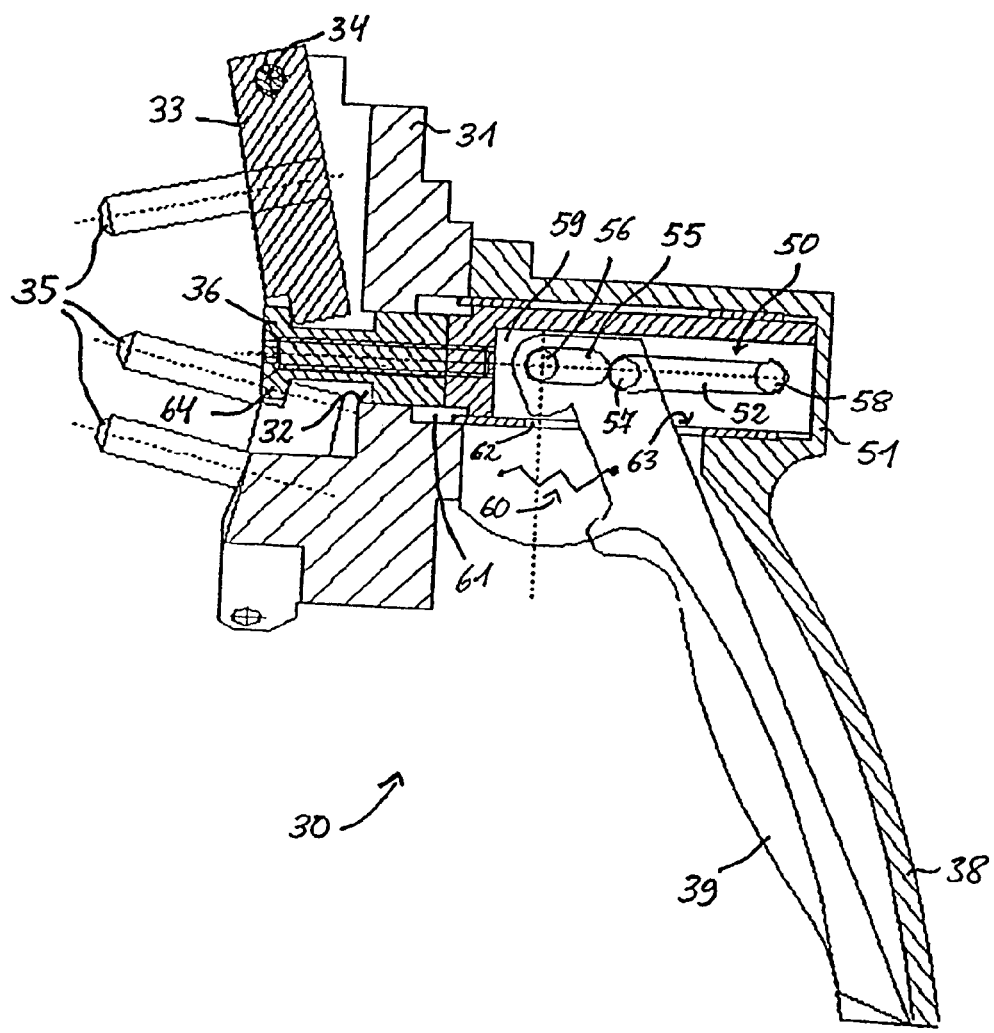

FIGS. 1 and 2 show in an unoperated starting position a first embodiment of a changing device 30. FIGS. 3 and 4 show the same changing device 30 in the operating end position. The upper half of the drawing in each case shows a part sectional, diagrammatic side view in the case of FIGS. 1 and 3, whereas in the lower drawing half in FIGS. 2 and 4 is shown the plan view also in the form of a diagrammatic, part sectional representation.

The changing device 30 is coupled to a closer 20. The closer 20 comprises several gripping jaws 21 separated from one another by slots 22. Connecting bodies 23 are placed in the slots 22. The connecting bodies 23 are made from elastically deformable material, particularly rubber-like, deformable material, such as e.g. natural and artificial rubbers with different additives influencing the material characteristics or colour. The connecting bodies can be positively and/or non-positively fixed to the two adjacent gripping jaws 21 by bonding and/or vulcanizing, but also by means of other fastening procedures. The connecting bodies 23 can fill all the slots 22, so that to the outside a body with a closed contour line is formed.

To be able to couple a changing device 30 to the closer 20, the latter has several receptacles 24 for coupling members.

At least one receptacle 24 for a coupling member is provided for each clamping or gripping jaw 21. The receptacles 24 are here provided on the workpiece-receiving side of the closer. The free end face of the closer 20 is particularly suitable.

For the machine-side fastening of the closer, e.g. in a draw-in tube, the closer 20 has an all-round groove 25, which in particular serves for the positive, axial and radial holding of the closer on the draw-in tube. The collet chuck is formed by the closer and the draw-in tube.

In the starting position shown in FIGS. 1 and 2 the closer 20 is in its assembly or storage state. The connecting bodies 23 are in a starting state in which the opposing forces compensate one another. On mounting the closer 20 on a draw-in tube there is a positive engagement behind of the groove 25 of closer 20. As a result the closer is at least axially held in the draw-in tube. FIGS. 3 and 4 show the position where the changing device 30 is in the operating end position. Through elastic deformation of the connecting bodies 23, which in particular reduces the outer circumference of the closer 20 in the vicinity of the groove 25, the positive connection between the closer 20 and draw-in tube is released. Thus, the closer 20 can be removed from or inserted in the draw-in tube.

In order to carry out the operation of the closer, the changing device 30 is provided. The changing device serves to release the positive connection between the closer 20 and the draw-in tube, as well as for handling the closer 20 when it has been released from the draw-in tube.

The changing device 30 can be coupled to the closer 20 by coupling members 35. In the embodiment shown here the coupling members 35 are constructed as lugs, which can be introduced into receptacles in the form of bores 24.

In the starting position shown in FIGS. 1 and 2, the coupling members 35 project axially from the swivel arms 33 in the direction of the closer 20. The swivel arms 33 are held by means of joints 34 on the carrier plate 31. The rotation axis 34 of each swivel arm 33 is positioned on the radial outside relative to a bore 32 in the carrier plate 31. The rotation axis of a joint 34 is tangential to the bore. This makes it possible to swivel the swivel arms in a plane containing the bore centre axis 37. They can therefore be swivelled radially to the bore axis.

The carrier plate 31 is traversed by the bore 32 in which is held in guided manner the tension bolt 36. In the manner shown in FIGS. 1 to 4, the tension bolt 36 can be a built-up part comprising a cylindrical shaft and a cover projecting radially outwards from said shaft. The tension bolt 36 traverses the carrier plate and with the cover engages behind the swivel arms 33. Through the back-engagement of the swivel arms, it is possible by means of the tension bolt 36 to exert tensile forces on the swivel arms 33, so that the coupling members 35 are swivelled about the joints 34 and are inclined inwards towards the bore centre axis 37. The swivelling movement leads to the leaving of the starting position shown in FIGS. 1 and 2 until the operating end position shown in FIGS. 3 and 4 is reached. Counter to the action of the rubber-like deformation of the connecting members 23, there is a deformation of the closer 20, which permits the release of the closer from the draw-in tube. The deforming forces introduced into the connecting bodies act as restoring forces, so that by means thereof a return from the operating end position of FIGS. 3 and 4 to the starting position of FIG. 1 takes place. In the case of such a swivelling back, the swivel arms 33 introduce the forces from the closer 20 into the changing device 30 and the tension bolt is moved back into the starting position of FIG. 1 by its back engagement of the swivel arms 33.

So that this return movement also takes place when no closer 20 is coupled to the changing device 30, it is possible to provide corresponding return springs. This makes it possible to construct the return springs between the two operating means, namely the two operating levers 38, 39. It is also possible to place corresponding return springs between the swivel arms 33 and the carrier plate 31. In order to bring about a good leverage for the restoring force, it is advantageous to position the corresponding return springs as close as possible to the bore 32.

An abutment 41 is formed on the back of the carrier plate 31 remote from the receptacle for the closer 20. The abutment is constructed as a fixed disk located on the carrier plate 31 and which also has a bore 32. The abutment 41 comprises a cylindrical body in which are shaped joint cups 46. Ball ends 45 of levers 44 are mounted in said joint cups 46. According to the invention there are three regularly spaced levers. In addition, the abutment 41 and swivel 43 have grooves, in which can come to rest the levers 44 when the swivel 43 and abutment 41 are mutually engaged, as is the case in the starting position shown in FIGS. 1 and 3/4. The grooves run substantially tangentially to the bore centre axis.

The facing ends of the levers 44 also have ball ends 45 held in joint cups 46, which are constructed on the swivel 43. The swivel 43 is held indirectly on the carrier plate 31 by the levers 44. The number and arrangement of the levers are determined in such a way that the swivel 43 can be swivelled about the bore centre axis 37 relative to the carrier plate 31. However, with said swivelling movement is forcibly coupled an axial movement with respect to this axis. In order to permit such a guiding holding of the swivel with respect to the carrier plate 31 by means of levers 44 alone, it is advantageous if there are at least three levers. The number of levers can also be reduced, but then possibly further guidance means are needed. It must be borne in mind that the tension bolt 36 also traverses the swivel 43, because the swivel 43 also has a corresponding bore and to this extent said tension bolt can also fulfil certain guidance functions. However, it is still advantageous to provide three or an even larger number of levers 44. In this case the degrees of freedom of the swivel 43 relative to the carrier plate 31 are adequately determined by the levers 44 alone.

The first operating lever 38 is at least indirectly held in fixed manner on the carrier plate 31 of the changing device 30 and projects substantially radially outwardly from the carrier plate 31 and can be ergonomically shaped to obtain good gripping characteristics. The second operating lever 39 is firmly connected to the swivel 43 and in the starting position of FIGS. 1 and 2 projects under a certain angle in the radial direction from the swivel 43 with respect to the first operating lever 38. The angle between the two operating levers 38, 39 is upwardly limited in that the two levers 38, 39 must be graspable by one hand in order to allow a one-handed operation and a one-handed manipulation of the changing device 30. The second operating lever 39 can also be ergonomically shaped with regards to its gripping characteristics. It is in particular possible to adopt shapes such as are used for gripping pliers.

With regards to the useability of the changing device 30 with both the left and right hands, it can be advantageous for the shape of the two levers to be the same. The choice of hand is not only dependent on the user and his habits, but also on the accessibility within the machine area.

On carrying out an operation of the changing device 30, there is a relative movement between the first and second operating levers due to the operating forces manually introduced by the user. The relative movement between the two operating levers 38, 39 initiated by the operating forces leads to an identical relative movement of the swivel 43 with respect to the carrier plate 31 with the abutment 41. It is a rotary movement about the bore centre axis 37, which consequently also defines the rotation axis 40 between the swivel and the carrier plate 31. In this case the rotation axis 40 and bore centre axis 37 are not only oriented coaxially to one another, but in fact correspond with one another.

As a result of the rotary movement and the supporting of the levers 44 in bilaterally positioned joint cups, there is a tilting up of the levers 44 between abutment 41 and swivel 43. This increases the axial spacing between these two parts with respect to the rotation axis 40. As, at least in the axial direction, the tension bolt 36 is held in fixed manner on the swivel 43, there is also an axial displacement of the tension bolt in the bore 32. The tension bolt is drawn away from the closer 30, e.g. through the axial tension bolt head 42 engaging over the swivel 43. Through the coupling of the tension bolt 36 with the swivel arms 33, a swivelling movement of said arms is brought about. There is a transition from the starting position shown in FIGS. 1 and 2 into the operating end position shown in FIGS. 3 and 4. The operating end position of FIGS. 3 and 4 reveal the first operating lever 38 and the second operating lever 39 in a position where they are immediately adjacent to and engage with one another, provided that this is permitted by their shaping.

Such a construction with a pivot bearing and levers 44 tilting over the same can be gathered from FIGS. 3 and 4, where the levers 44 are aligned as coaxially as possible with the rotation axis 40 in the operating end position. Thus, if the forces opposing operation, namely the deformation forces for the rubber-like connecting bodies 23, are at a maximum, there is a maximum leverage between the swivel 43 and abutment 41 via levers 44. Thus, the necessary operating forces for operating the two operating levers 38, 39 remain within appropriate limits. The power ratio and power path are significantly co-determined by means of the length of the levers 44. Thus, in accordance with circumstances and the necessary forces, adaptation takes place to the conditions for each individual changing device.

Figure 5:
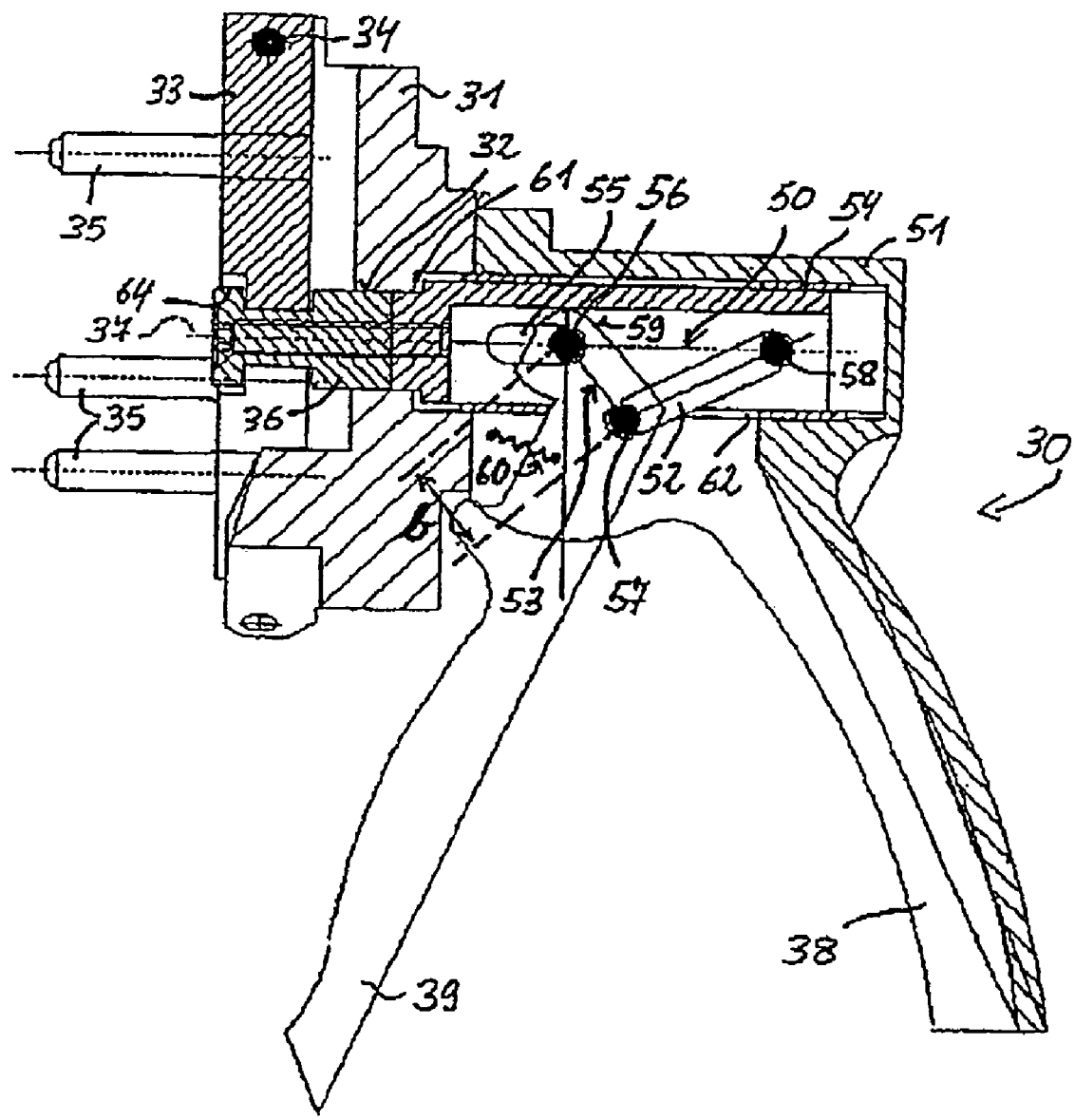
FIGS. 5 and 6 Part sectional representations of a second embodiment of an inventive changing device in the unoperated and operated positions of said device without showing the closer.
Figure 6:
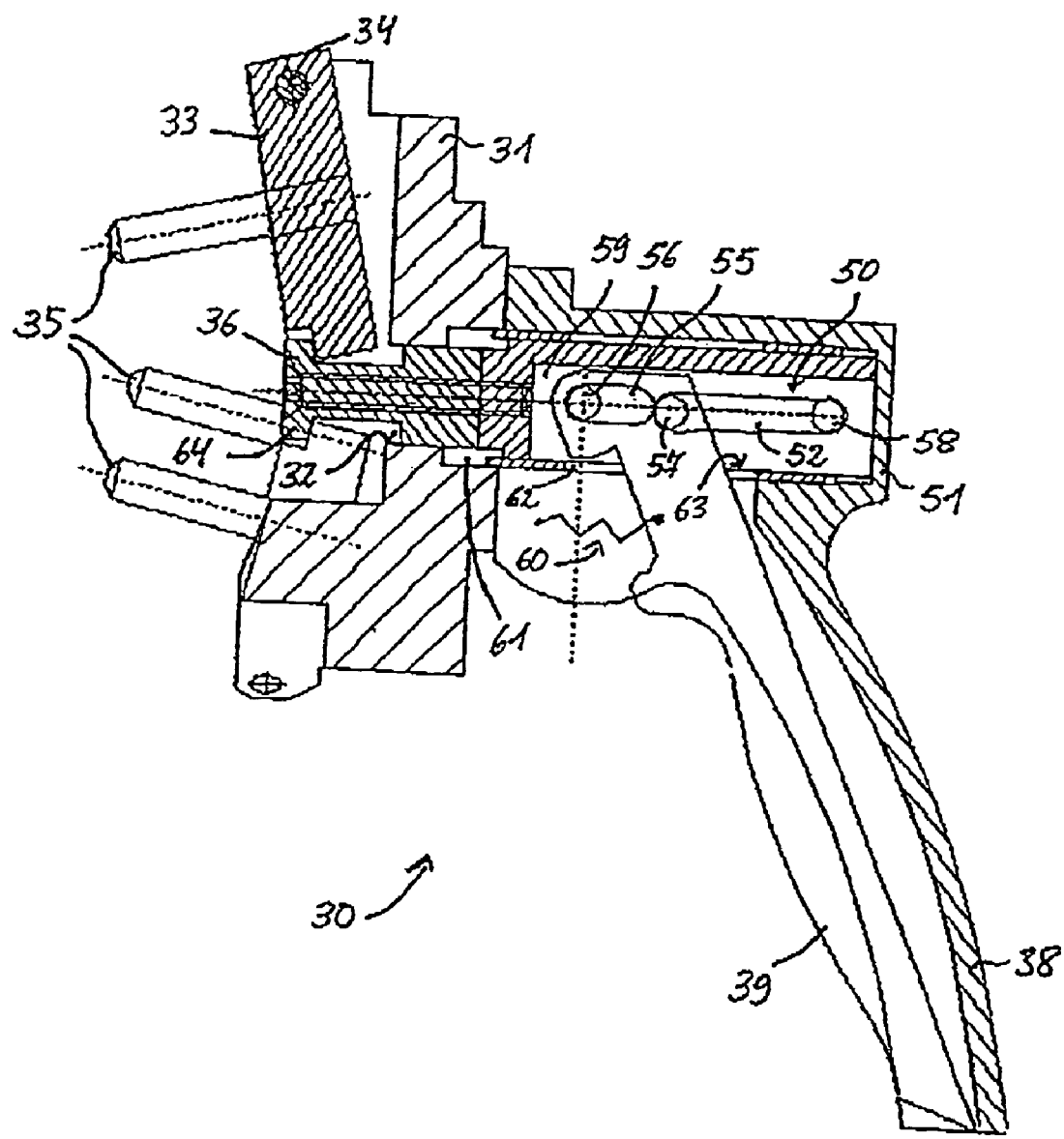

FIGS. 5 and 6 show a second embodiment of the changing device 30 according to the invention. In the embodiment according to FIGS. 5 and 6 the rotation axis 40 of the second operating lever 39 is not coaxial to the bore centre axis 37, but instead perpendicular thereto, relative to the first operating lever 38.

In the embodiments according to FIGS. 5 and 6 the design of the carrier plate 31 and swivel arms 33, together with the use of the latter by means of joints 34 on carrier plate 31 essentially correspond to the embodiment according to FIGS. 1 to 4, so that a further description will not be given. The coupling members 35 constructed as lugs also correspond to the coupling pieces of FIGS. 1 to 4. To illustrate the swivelling movement and for simplifying study, the closer 20 is not shown in FIGS. 5 and 6. However, the changing device 30 according to FIGS. 5 and 6 is suitable for use in connection with closers, which correspond to the closers 20 shown in FIGS. 1 to 4. FIG. 5 again shows the unoperated starting position and FIG. 6 the corresponding operating end position of the changing device 30. Both drawings are part sectional, diagrammatic representations of a corresponding changing device.

A cylindrically constructed, high section 51 projects from the back of the carrier plate 31 remote from the swivel arms 33. A sleeve 54 is located in the interior of the pipe section, which is positioned concentrically to the bore 32 in carrier plate 31. It is closed at its rear end remote from the carrier plate 31. The sleeve 54 is located in the interior of the pipe section 51. The wall thickness of the sleeve 54 and the internal diameter of the pipe section 51 are such that the internal diameter of sleeve 54 corresponds to the diameter of bore 32. In the vicinity of the carrier plate can be provided a widening 61 of the bore 32, so that the internal diameter in the vicinity of the widening 61 corresponds to the internal diameter of the pipe section 51. Thus, the sleeve 54 can project into the vicinity of the widening 61.

On one side of the pipe section 51 and in a substantially radially projecting manner is provided a first operating lever 38. The latter is in particular shaped in such a way that a particularly good engagement is provided in the hand in the area between thumb and hand surface. In the area between the carrier plate 31 and the first operating lever 38, the pipe section 51 has an opening 63, which is in particular in slot form. The second operating lever 39 passes through said opening 63 into the interior of the sleeve 54, which for this purpose has a slot 62 in this area. The second operating lever 39 is held by the toggle lever arrangement 50 and can be swivelled about a rotation axis perpendicular to the drawing plane with respect to the first operating lever. The second lever is in particular constructed in such a way that it can be grasped in an ergonomically favourable manner by the fingers of one hand, whose thumb engages behind the first operating lever 38.

The toggle lever arrangement 50 comprises three fulcrum or rotation points. There is firstly the rotation axis fixed by the safety bolt 58, which also forms the rotation centre of the longer of the two lever arms 52 on the safety bolt 58. At the other end of the longer lever arm 52 the bearing opening 57 produces a rotary connection between the longer lever arm 52 and the second operating lever 39. The shorter lever arm 53 is defined by the spacing b between the bearing opening 57 and the king pin 56 and is part of the second operating lever 39. The king pin 56 traverses the diametrically facing elongated holes 55 of the tension bolt 36. The king pin 56 defines a rotation point fixed with respect to the pipe section 51, because it is constructed in such a way that it traverses both the sleeve 54 and pipe section 51 in corresponding bores and therefore fixes the position relative to the pipe section 51. The king pin projecting through the elongated holes 55 limits the maximum path of the tension bolt 36 in the pipe section 51 and consequently defines the starting position and operating end position. The second operating lever projects into the recess 65 which is constructed for this purpose in the tension bolt 36 and with respect to which the elongated holes 55 are laterally positioned.

In order to obtain a clearly defined operating starting position for the second operating lever 39, between the latter and the carrier plate 31 or a component fixed with respect thereto the return spring 60 is provided. The latter draws the second operating lever 39 into a position in which it is far removed from the first operating lever 38, but should still be grippable with one hand. As a result of the coupling between the second operating lever 39 and the tension bolt 36 by means of the king pin 56 guided in the elongated hole 55, there is a clearly defined position of the swivel arms 33. The swivel arms 33 are so held in the diameter-reduced area of the tension bolt that to the same can be transferred both tension and tensile forces. The tension bolt 36 has in the vicinity of the swivel arms 33 a section whose external diameter is smaller than the external diameter in the vicinity of the bore 32 in carrier plate 31 in which tension bolt 36 is held in guided manner. Following the area over and beyond which the swivel arms 33 can be bilaterally embraced by the king pin, a cover 64 is provided, which again increases to the original amount the external diameter of the tension bolt. The swivel arms 33 are so held between the parts of the tension bolt 36 that it is able to transfer to the latter both push and pull forces. The cover 64 can in particular be the head of a screw or a head part detachably fixed on the tension bolt by means of a screw.

If there is a transfer of the second operating lever 39 in the direction of the operating end position shown in FIG. 6, the second operating lever is swivelled about its rotation centre defined by the king pin 56. As a result of the spacing b formed by the shorter lever arm 53 of the toggle lever arrangement 50 and the guidance of the tension bolt 36 in pipe section 51 or in sleeve 54, the safety bolt 58, by means of which the free end of the longer lever arm 52 is fixed to the tension bolt 36, is rearwardly pressed away from the closer 20. The toggle lever arrangement extends into a position in which the three swivel axes of said arrangement are approximately in one plane. This is in particular the median plane of the elongated hole 55. In this operating end position as shown in FIG. 6, the second operating lever almost completely engages on the first operating lever. Thus, during operation the tension bolt 36 is shoved rearwards. The most favourable lever transmission which most increases the leverage between the first and second operating levers is obtained when the operating end position is at least approximately reached. It is here that the greatest restoring forces from the closer act on the changing device and the swivel arms 33. To ensure the return of the second operating lever into the starting position shown in FIG. 5, the return spring 62, which can be constructed as a tension spring, is connected between the second operating lever 39 and carrier plate 31 or a component fixed with respect thereto. During the return movement the tension bolt 36 again slides forward in the pipe section 56. Due to the fact that the swivel arms 33 are in engagement with the tension bolt 36 in both the push and pull directions, the swivel arms 33 are returned to their starting position in which they can be coupled to and uncoupled from the closer 20. In the operating end position shown in FIG. 6, the swivel arms 33 are so swivelled about the joint 34 with a radial component that the tips of the coupling members 35, constructed as stay bolts, move towards one another. Thus, they perform a corresponding movement moving the gripping jaws of a closer towards one another, such as is also produced with the changing device according to FIGS. 1 to 4.

What is claimed is:

1. A changing device for closers, the closers having several gripping jaws, the gripping jaws being separated from one another by radially directed slots and which are elastically interconnected, the changing device comprising:
   a carrier plate with a bore;
   axially displaced swivel arms articulated centrally with respect to the bore and a joint by which they can be swivelled radially to the bore axis, relative to the carrier plate;
   coupling members provided on the swivel arms for coupling the changing device to the gripping jaws; and
   an axially movable tension bolt, which traverses the carrier plate bore and engages on the swivel arms,
   wherein operating levers are provided for the manual operation of the changing device, wherein a first operating lever is fixed with respect to the carrier plate and a second operating lever is rotatable with respect to the first operating lever and engages on the tension bolt.

2. The changing device according to claim 1, wherein the operating levers can be transferred from a starting position, where the operating levers are spaced far apart, into an operating end position where the operating levers are close together.

3. The changing device according to claim 1, wherein in a starting position of the operating levers, the changing device can be engaged or disengaged again with the closer by coupling members and in an operating end position of the operating levers the closer can be removed from ha machine-side holder.

4. The changing device according to claim 1, wherein the second operating lever can be rotated about a rotation axis running parallel to the bore wit respect to the first operating lever.

5. The changing device according to claim 4, wherein the second operating lever can be rotated coaxially to the bore.

6. The changing device according to claim 4, wherein the second operating lever projects from a swivel held by at least two levers supported on the one hand on the swivel and on the other at least indirectly on the carrier plate.

7. The changing device according to claim 6, wherein the levers are bilaterally held in such a way that during an operation of the operating levers from the starring position in the direction of the operating end position they tilt up and increase the spacing between the carrier plate and swivel.

8. The changing device according to claim 6, wherein the swivel is held by three levers.

9. The changing device according to claim 1, wherein the second operating lever is rotatable about a rotation axis perpendicular to the bore with respect to the first operating lever.

10. The changing device according to claim 9, wherein a toggle lever arrangement is constructed between the first and second operating levers.

11. The changing device according to claim 10, wherein the first operating lever projects radially from a pipe section placed on the carrier plate in the axial extension of the bore.

12. The changing device according to claim 10, wherein the toggle lever arrangement has two lever arms, the second operating lever being supported on the pipe section by the shorter of the two lever arms.

13. The changing device according to claim 12, wherein the tension bolt projects into the pipe section and has two parallel, facing elongated holes and an intermediate area with a recess, the tension bolt being axially displaceably mounted relative to the king pin by the elongated holes and where, spaced from the bearing lug of the longer lever arm, the king pin traverses the second operating lever and said spacing forms the shorter lever arm.

14. The changing device according to claim 12, wherein a safety bolt traverses the rear end of the tension bolt and forms the pivot bearing of the longer operating lever on the tension bolt.

15. The changing device according to claim 10, wherein the second operating lever is supported by a rounded rolling edge on the inner face of a sleeve inserted in the pipe section.

16. The changing device according to claim 10, wherein the three swivel axes of the toggle lever arrangement in the operating end position are at least approximately in one plane.

17. The changing device according to claim 16, wherein the plane is in the median plane of the elongated holes of the toggle lever arrangement.

18. The changing device according to claim 16, wherein between the first and second operating levers is provided at least one return spring, which urges the second operating lever in the direction of the starting position.

19. The changing device according to claim 16, wherein the swivel levers are supported on the tension bolt in both the push and pull directions.

* * * * *